(12) United States Patent
Karl et al.

(10) Patent No.: US 7,529,180 B1
(45) Date of Patent: May 5, 2009

(54) SWITCH FAILOVER FOR AGGREGATED DATA COMMUNICATION LINKS

(75) Inventors: Michael Karl, Karlsruhe (DE); Thomas Ruf, Sasbach (DE); Manfred Kunz, Rastatt (DE); Joachim Schmalz, Bischweier (DE)

(73) Assignee: Marvell International Ltd., Hamilton (BE)

( * ) Notice: Subject to any disclaimer, the term of this patent is extended or adjusted under 35 U.S.C. 154(b) by 1007 days.

(21) Appl. No.: 10/358,713

(22) Filed: Feb. 4, 2003

Related U.S. Application Data (60) Provisional application No. 60/368,937, filed on Mar. 29, 2002.

(51) Int. Cl.
*H04L 1/00* (2006.01)

(52) U.S. Cl. .................. 370/216; 370/235; 370/242; 370/252

(58) Field of Classification Search ............ 370/216, 370/217, 218, 225, 227, 228, 229, 230, 235, 370/237, 242, 252, 254, 257, 238.1
See application file for complete search history.

(56) References Cited

U.S. PATENT DOCUMENTS

| | | | | |
|---|---|---|---|---|
| 6,687,758 | B2* | 2/2004 | Craft et al. ................... | 709/250 |
| 6,961,318 | B2* | 11/2005 | Fichou et al. ............... | 370/254 |
| 6,970,420 | B1* | 11/2005 | Kalkunte et al. ............ | 370/230 |
| 7,072,304 | B2* | 7/2006 | Ng et al. ..................... | 370/238 |
| 7,136,377 | B1* | 11/2006 | Tweedly et al. ............. | 370/356 |
| 7,139,242 | B2* | 11/2006 | Bays .......................... | 370/238 |
| 7,391,732 | B1* | 6/2008 | Cortez et al. ................ | 370/238 |
| 2002/0009092 | A1* | 1/2002 | Seaman et al. ............. | 370/406 |
| 2003/0147400 | A1* | 8/2003 | Devi ..................... | 370/395.21 |

* cited by examiner

*Primary Examiner*—Chi H. Pham
*Assistant Examiner*—Shick Hom (57) ABSTRACT

A network device, method and computer program product for communicating data over aggregated links, wherein each of the aggregated links comprises a plurality of data communication links. The network device comprises n ports; and a processor to determine a link quality for each of m of the aggregated links, wherein $m \geq 2$, wherein each of the m aggregated links comprises a preselected plurality p of the n ports, select one of the m aggregated links based on the link quality determined for each of the m aggregated links, and send the data over the selected one of the m aggregated links.

24 Claims, 5 Drawing Sheets

SWITCH FAILOVER FOR AGGREGATED DATA COMMUNICATION LINKS

CROSS-REFERENCE TO RELATED APPLICATIONS

This application claims the benefit of U.S. Provisional Patent Application Ser. No. 60/368,937 entitled "Switch Failover for Aggregated Data Communication Links," filed Mar. 29, 2002, the disclosure thereof incorporated by reference herein in its entirety.

BACKGROUND

The present invention relates generally to data communications. More particularly, the present invention relates to failover for aggregated data communication links.

Link aggregation or trunking is a method of combining multiple physical data communication links to form a single logical link, thereby increasing the capacity and availability of the communications channel between network devices such as servers, switches, end stations, and other network-enabled devices. For example, two or more Gigabit Ethernet or Fast Ethernet connections between two network devices can be combined to increase bandwidth capability and to create resilient and redundant links.

Link aggregation also provides load balancing, which is especially important for networks where it is difficult to predict the volume of data directed to each network device. Link aggregation distributes processing and communications activity evenly across a network so that no single network device is overwhelmed.

Link aggregation is documented in the Institute of Electrical and Electronics Engineers (IEEE) standard 802.3ad, which is incorporated by reference herein in its entirety. For convenience, several terms useful while discussing link aggregation are provided here.

Aggregator: A uniquely identifiable entity comprising (among other things) an arbitrary grouping of one or more aggregation ports for the purpose of aggregation. An instance of an aggregated link always occurs between exactly two Aggregators.

Aggregation Port: An instance of a Media Access Control-Physical Layer entity within an Aggregation System.

Aggregation System: A uniquely identifiable physical entity.

Aggregation Link: A data communication link that is an instance of a Media Access Control-Physical Layer-Medium-Physical Layer-Media Access Control entity between a pair of Aggregation Ports.

Aggregated Link: The logical link formed by the link aggregation of all of the aggregation links in an Aggregator.

Link aggregation provides several benefits, such as increased link availability. Link aggregation prevents the failure of any single aggregation link from causing a disruption of the communications between the interconnected network devices. While the loss of an aggregation link within an aggregated link reduces the available capacity of the aggregated link, the connection between the network devices is maintained and the data flow is not interrupted.

Link aggregation also increases link capacity. The performance of the communications between two network devices is improved because the capacity of an aggregated link is higher than the capacity of any of its constituent aggregation links. Link aggregation also permits data rates other than those that are generally available. Standard local-area network (LAN) technology provides data rates of 10 Mb/s, 100 Mb/s, and 1000 Mb/s. Link aggregation can fill the gaps between these available data rates when an intermediate performance level is more appropriate.

Link aggregation increases link availability and capacity without hardware upgrades. To increase link capacity, there are usually only two possibilities: either upgrading the native link capacity of the network devices, or aggregating two or more lower-speed aggregation links (if available). Upgrades are typically performed by increasing the link speed by an order of magnitude. In many cases, however, the network device cannot take advantage of this increase. A performance improvement of an order of magnitude is not achieved; moreover the bottleneck is simply moved from the network link to some other element within the network device. Thus, the performance is always limited by the end-to-end connection.

Link aggregation can be less expensive than a hardware speed upgrade and yet achieve a similar performance level. Both the hardware costs for a higher-speed link and the equivalent number of lower-speed connections have to be balanced to decide which approach is more advantageous. Sometimes link aggregation may even be the only means to improve performance when the highest data rate available on the market is not sufficient.

While link aggregation mitigates many problems, such as the failure of an aggregation link within an aggregated link, it fails to address other problems, such as switch failure.

Figure 1:
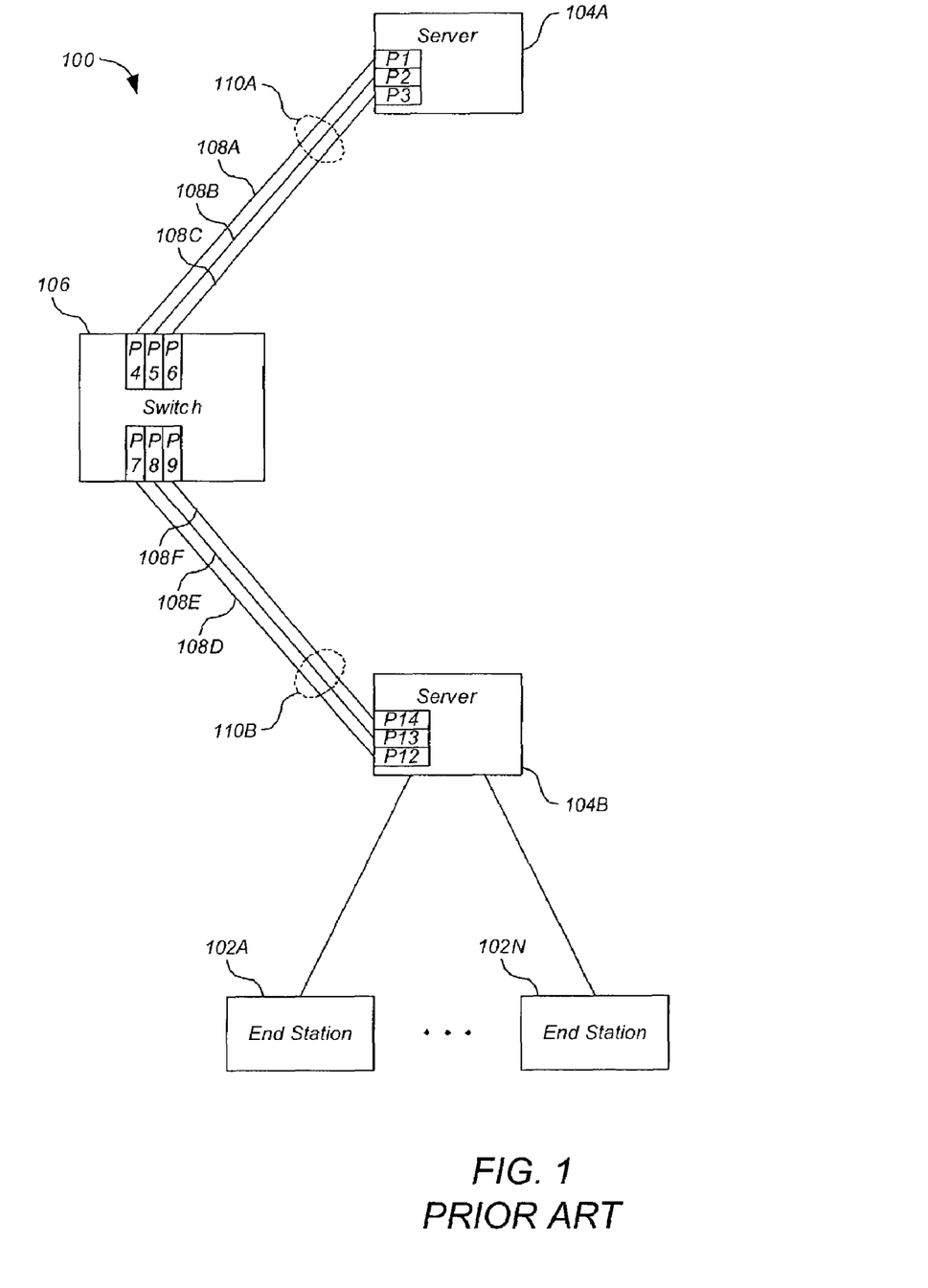
FIG. 1 shows a conventional data communications system.

FIG. 1 shows a data communications system 100 comprising a plurality of end stations 102A through 102N that communicate with a server 104A through another server 104B, a switch 106, and a plurality of aggregation links 108. Aggregation links 108 have been aggregated to form two aggregated links 110. Aggregated link 110A comprises aggregation links 108A, 108B, and 108C, which include respective aggregation ports P1, P2, and P3 in server 104A and respective aggregation ports P4, P5, and P6 in switch 106. Aggregated link 110B comprises aggregation links 108D, 108E, and 108F, which include respective aggregation ports P7, P8, and P9 in switch 106 and respective aggregation ports P12, P13, and P14 in server 104B.

Assume that each of aggregation links 108 is a Gigabit Ethernet link (that is, each of aggregation links 108 has a bandwidth of 1 Gb/s). Thus, each of aggregated links 110 has a bandwidth of 3 Gb/s. Should one of the aggregation links 108 within aggregated link 110A fail, aggregated link 110A would have a bandwidth of 2 Gb/s, and communications between servers 104A and 104B could continue at this reduced rate.

However, should switch 106 fail, communications between servers 104A and 104B would cease completely. Link aggregation cannot mitigate switch failure at all.

SUMMARY

In general, in one aspect, the invention features a method and computer-readable media for transferring data from a first network device comprising n ports to a second network device over aggregated links, wherein each of the aggregated links comprises a plurality of data communication links, and wherein each of the n ports is connected to a different one of n data communication links, wherein n≧2. It comprises determining a link quality for each of m of the aggregated links, wherein m≧2, wherein each of the m aggregated links comprises a preselected plurality p of the n ports and the p data communication links connected to the p ports in the aggregated link; selecting one of the m aggregated links based on the link quality determined for each of the m aggregated links; and transferring the data from the first network device to the second network device over the selected one of the m aggregated links.

Particular implementations can include one or more of the following features. The link quality for an aggregated link represents at least one of the group comprising a link status of the data communication links in the aggregated link; a bandwidth of the aggregated link; and a bit error rate of the aggregated link. Implementations comprise aggregating ones of the n ports to form the m aggregated links. Aggregating comprises executing a link aggregation control protocol. The link aggregation control protocol complies with Institute of Electrical and Electronics Engineers (IEEE) standard 802.3ad. Implementations comprise, before aggregating the ones of the n ports to form the m aggregated links, selecting the n ports to form a team; and assigning a media access control address to the team; wherein the first network device sends the data to the team by using the media access control address. The media access control address is also assigned to one of the ports in the team. Implementations comprise assigning an internet protocol address to the team; wherein the first network device sends the data to the team by using the internet protocol address.

In general, in one aspect, the invention features a network device for communicating data over aggregated links, wherein each of the aggregated links comprises a plurality of data communication links. It comprises n ports; and a processor to determine a link quality for each of m of the aggregated links, wherein m≧2, wherein each of the m aggregated links comprises a preselected plurality p of the n ports, select one of the m aggregated links based on the link quality determined for each of the m aggregated links, and send the data over the selected one of the m aggregated links.

Particular implementations can include one or more of the following features. Each of the n ports is connected to a different one of n of the data communication links, wherein n≧2, and the link quality for an aggregated link represents at least one of the group comprising a link status of the data communication links in the aggregated link; a bandwidth of the aggregated link; and a bit error rate of the aggregated link. The processor aggregates ones of the n ports to form the m aggregated links. The processor aggregates ones of the n ports to form the m aggregated links by executing a link aggregation control protocol. The link aggregation control protocol complies with Institute of Electrical and Electronics Engineers (IEEE) standard 802.3ad. The processor before aggregating the ones of the n ports to form the m aggregated links, selects the n ports to form a team; assigns a media access control address to the team; and sends the data to the team by using the media access control address. The media access control address is also assigned to one of the ports in the team. The processor further assigns an internet protocol address to the team; and sends the data to the team by using the internet protocol address.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

As used herein, the term "server" generally refers to an electronic device or mechanism. As used herein, the term "mechanism" refers to hardware, software, or any combination thereof. These terms are used to simplify the description that follows. The servers and mechanisms described herein can be implemented on any standard general-purpose computer, or can be implemented as specialized devices.

Another concept that is useful in explaining embodiments of the present invention is the "team." A team is a uniquely-identifiable logical entity comprising one or more Aggregators. A MAC Client is served by a single team at a time. An Aggregation System can contain multiple teams.

Figure 2:
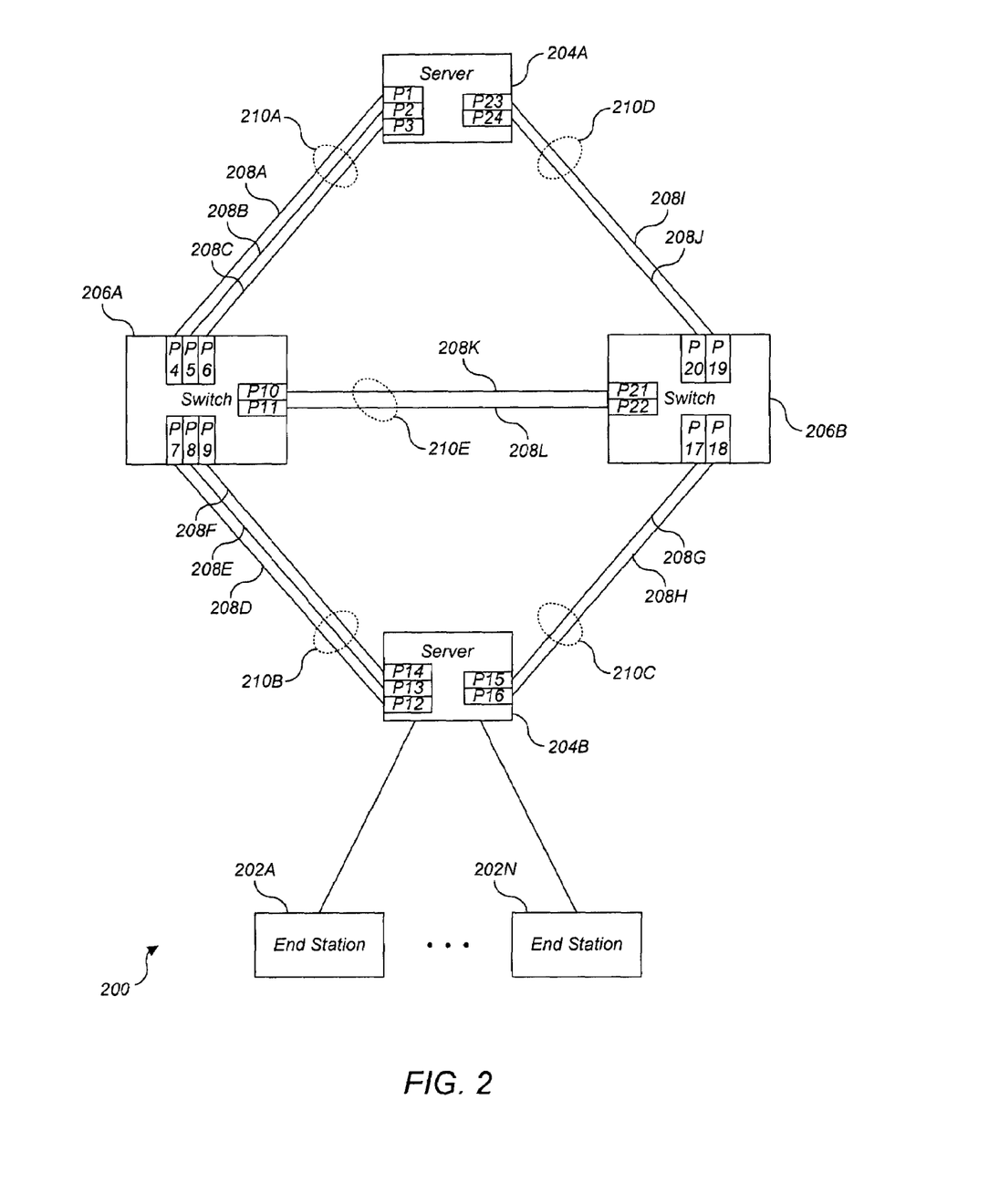
FIG. 2 shows a data communications system according to a preferred embodiment.

FIG. 2 shows a data communications system 200 according to a preferred embodiment. Data communications system 200 comprises a plurality of end stations 202A through 202N, such as computers, personal digital assistants, and the like, that communicate with a server 204A through another server 204B, two switches 206A and 206B, and a plurality of aggregation links 208. Aggregation links 208 have been aggregated to form five aggregated links 210.

Aggregated link 210A comprises aggregation links 208A, 208B, and 208C, which include respective ports P1, P2, and P3 in server 204A and respective ports P4, P5, and P6 in switch 206A.

Aggregated link 210B comprises aggregation links 208D, 208E, and 208F, which include respective aggregation ports P7, P8, and P9 in switch 206, and respective aggregation ports P12, P13, and P14 in server 204B.

Aggregated link 210C comprises aggregation links 208G and 208H, which include respective aggregation ports P15 and P16 in server 204B, and respective aggregation ports P17 and P18 in switch 206B.

Aggregated link 210D comprises aggregation links 208I and 208J, which include respective aggregation ports P19 and P20 in switch 206B, and respective aggregation ports P23 and P24 in server 204A.

Aggregated link 210E comprises aggregation links 208K and 208L, which include respective aggregation ports P10 and P11 in switch 206A, and respective aggregation ports P21 and P22 in switch 206B.

According to a preferred embodiment of the present invention, the aggregation ports of a network device can be associated to form a virtual port referred to herein as a "team." The aggregation ports within a team can be aggregated to form one or more aggregators. The team uses only one of its aggregators at a time, and chooses that active aggregator based on link quality criteria. The link quality of the aggregators in a team is monitored. When the link quality of the aggregated link comprising the active aggregator falls below the link quality of one of the inactive aggregators in the team, the team switches traffic to that aggregator. This process, referred to herein as "redundant switch failover," is described in detail below.

Figure 3:
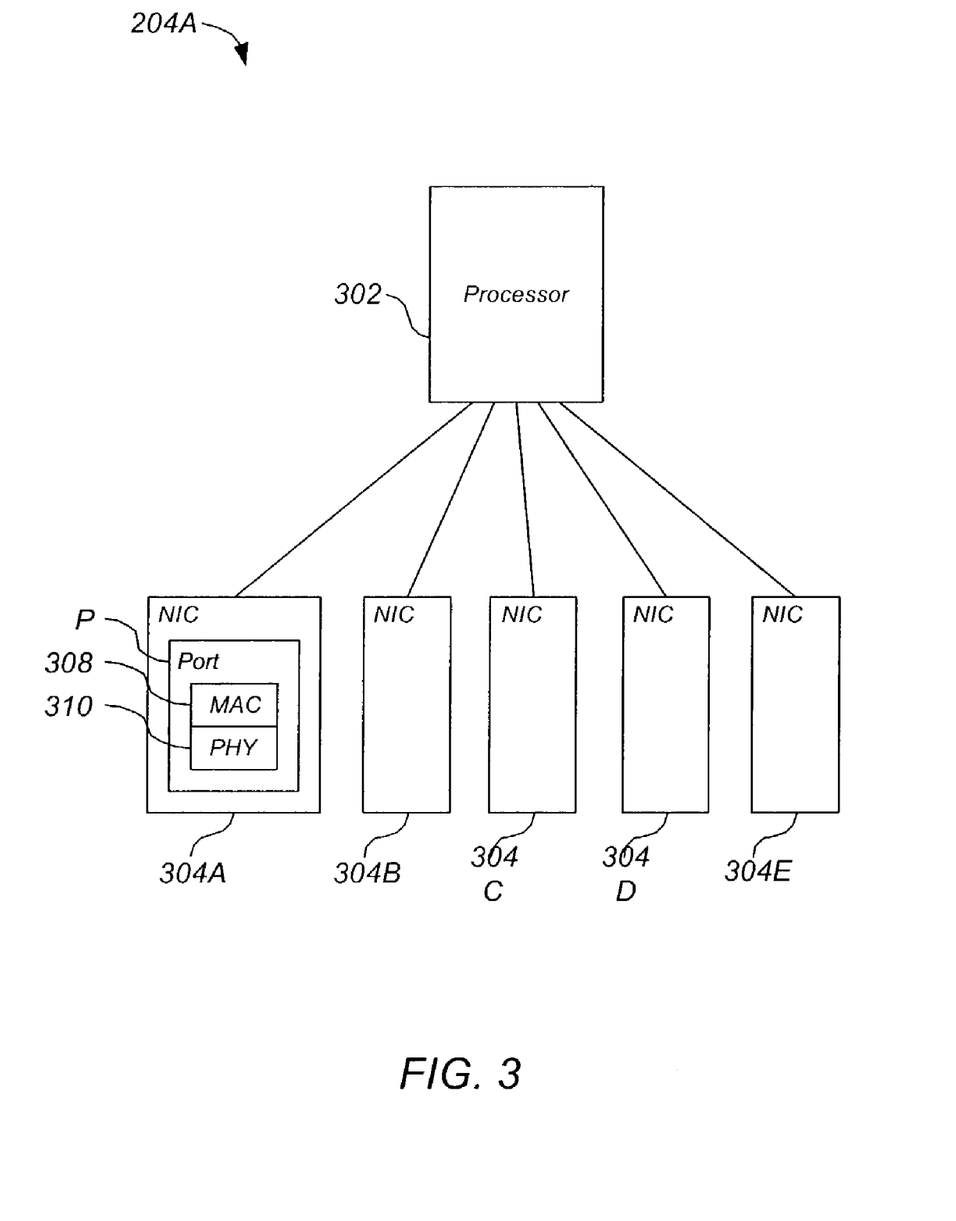
FIG. 3 shows detail of a server of FIG. 2 according to a preferred embodiment.

FIG. 3 shows detail of server 204A according to a preferred embodiment. Server 204A comprises a processor 302 and a plurality of network interface cards (NIC) 304 each connected to one of aggregation links 108. Processor 302 can be implemented as a single processor, or as multiple parallel processors, as may be desirable when each aggregation link 108 operates at gigabit data rates.

Each NIC 304 comprises one or more ports P, each comprising a media access controller (MAC) 308 and a physical layer device (PHY) 310. Each MAC 308 in server 240A has a unique MAC address, as is well-known in the relevant arts.

Figure 4:
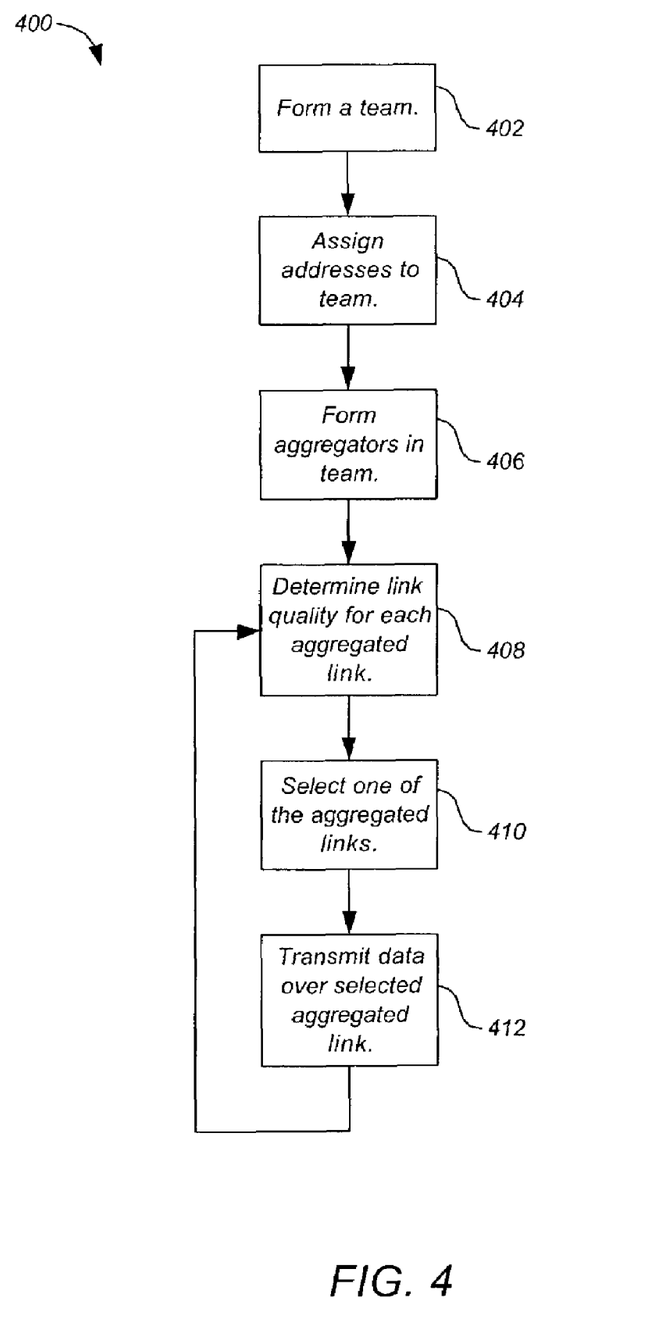
FIG. 4 is a flowchart of a redundant switch failover process performed by a processor of the server of FIG. 3 according to a preferred embodiment.

FIG. 4 is a flowchart of a redundant switch failover process 400 performed by processor 302 of server 204A according to a preferred embodiment. Although for convenience process 400 is described for server 204A, process 400 applies equally well to other types of network devices, such as switches, end stations, and the like.

Process 400 begins by forming a team (step 402). A network device can form multiple teams, but for clarity, only one such team is described. The team is user-defined.

Process 400 assigns Internet protocol (IP) and media access control (MAC) addresses to the team (step 404). The MAC address is preferably the MAC address of one of the ports P within the team. The IP address is assigned to the team manually or automatically by a Dynamic Host Configuration Protocol (DHCP) or some other automatic process.

Process 400 then aggregates ports P within the team to form aggregators (step 406). Preferably the ports are aggregated by a link aggregation control protocol (LACP) such as that specified by IEEE standard 802.3ad. However, other methods of aggregation can be used. Each aggregator, together with the data communication links connected to the ports in the aggregator and the ports in the partner network device that are connected to those data communication links, forms an aggregated link, as described above.

Process 400 then determines a link quality for each of the aggregated links (step 408). The link quality for an aggregated link can represent one or more characteristics of the aggregated link such as the link status of the aggregation links in the aggregated link, the bandwidth of the aggregated link, the bit error rate of the aggregated link, and the like.

Process 400 then selects one of the aggregated links based on the link quality determined for each of the aggregated links (step 410). Process 400 selects the aggregated link having the highest link quality.

Process 400 thereafter transmits data over the selected aggregated link (step 412). For example, processor 302 in server 204A transmits data using the IP and MAC addresses assigned to the team. The team then transmits the data to the MAC address assigned to the selected aggregator by LACP.

Process 400 thereafter continually monitors the link quality for each aggregated link (step 408), and selects the aggregated link with the best link quality to transmit data (step 410). This changing between aggregated links is automatic (that is, no user intervention is required), and can be caused in many ways, including link failure, failure of another network device such as a switch, physical reconfiguration of the network, and the like. In addition, when an automatic link aggregation control protocol is used, the aggregators are reconfigured when such changes occur; the redundant switch failover process recognizes these changes and works with the newly-configured aggregators.

Figure 5:
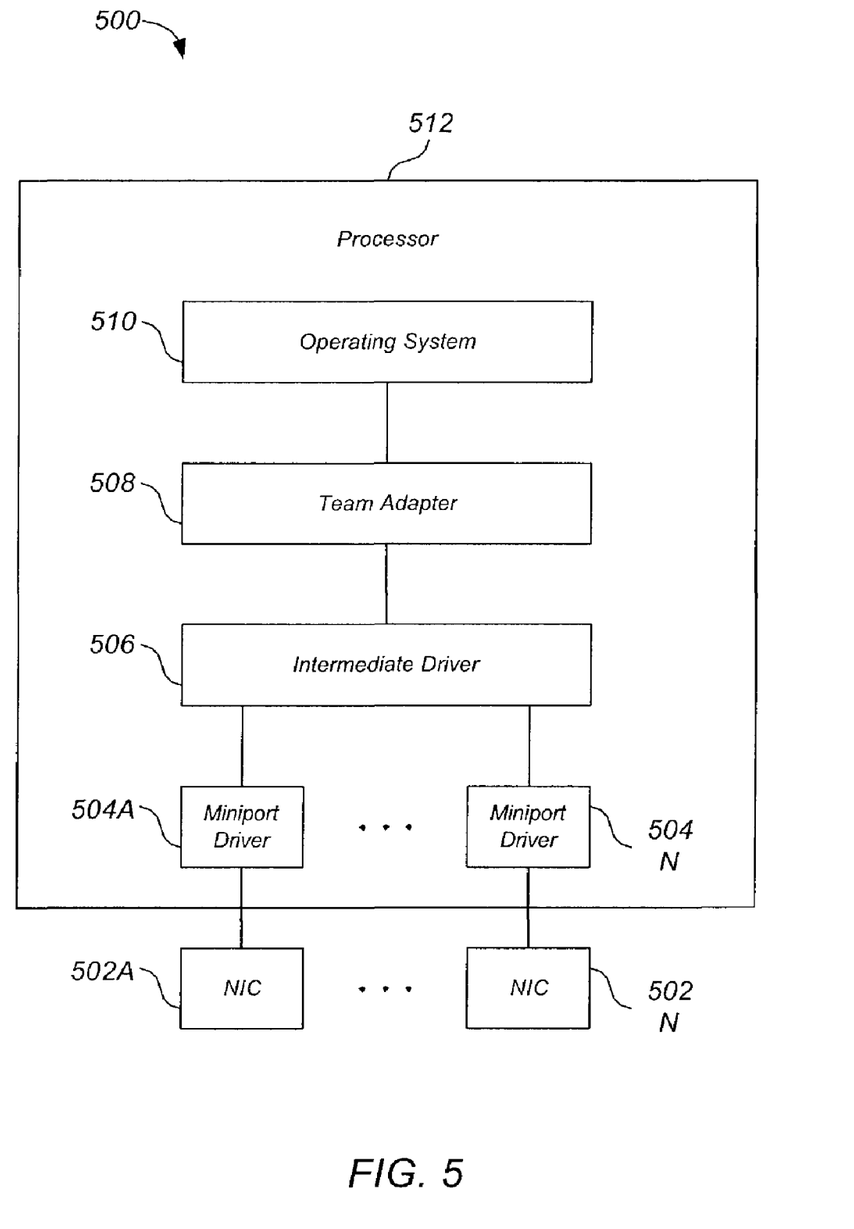
FIG. 5 is a block diagram of a preferred embodiment as implemented in a Microsoft Windows operating system environment.

FIG. 5 is a block diagram of a preferred embodiment 500 as implemented in a Microsoft Windows operating system environment. Embodiment 500 comprises a plurality of physical network adapters such as network interface cards (NIC) 502A through 502N connected to a processor 512. An instance of a miniport driver 504A through 504N is associated with each NIC 502. A intermediate driver 506 is associated with miniport derivers 504, and communicates with a team adapter 508 using transport control protocol/Internet protocol (TCP/IP). Team adapter 508 communicates with operating system 510.

Teams are configured within team adapter 502, which is assigned IP and MAC addresses as described above. Operating system 510 sees team adapter 508 as a virtual network adapter, and communicates with team adapter 508 using the IP and MAC addresses assigned to team adapter 508.

Team adapter 508 communicates with intermediate driver 506 using TCP/IP. Intermediate driver 506 preferably executes the redundant switch failover process described above and the LACP process described by IEEE standard 802.3ad. Miniport adapters 502 exchange data between intermediate driver 506 and NICs 502.

Now an example of the redundant switch failover process is described with reference to FIG. 2. Assume the user selects all of the ports P in server 204A to be part of a team such that the team comprises ports P1, P2, P3, P23 and P24. Further assume that LACP creates the aggregated links 210 discussed above with respect to FIG. 2. Further assume that each of the aggregation links 208 operates at gigabit speeds. Therefore aggregated link 210A has a bandwidth of 3 Gb/s, while aggregated link 210D has a bandwidth of 2 Gb/s. The redundant switch failover process running in server 204A therefore selects aggregated link 210A instead of aggregated link 210D, and transmits data over aggregated link 210A. Similarly, the redundant switch failover process running in switch 206A selects aggregated link 210B instead of aggregated link 210E, and transmits data over aggregated link 210B.

Now assume that switch 206A fails. The redundant switch failover process running in server 204A detects the failure as a reduction in the link quality of aggregated link 210A, and therefore selects aggregated link 210D instead of aggregated link 210A and transmits data over aggregated link 210D. Similarly, the redundant switch failover process in switch 206B detects the failure of switch 206A as a reduction in the link quality of aggregated link 210E, and therefore selects aggregated link 210C instead of aggregated link 210E, and transmits the data over aggregated link 210C. Thus despite the failure of switch 106A, the data transmission continues.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. List any additional modifications or variations. Accordingly, other implementations are within the scope of the following claims.

What is claimed is:

1. A method for transferring data from a first network device comprising n ports to a second network device over a plurality of aggregated links, wherein each of the plurality of aggregated links comprises a plurality of data communication links, and wherein each of the n ports is connected to a different one of n of the data communication links, wherein n≧2, the method comprising:
   determining a link quality for each of m of the plurality of aggregated links, wherein m≧2, wherein each of the m aggregated links comprises a preselected plurality p of the n ports and the p data communication links connected to the p ports in the aggregated link;
   selecting one of the m aggregated links as an active link based on the link quality determined for each of the m aggregated links and a status of a switch that connects the first network device to the second network device via one of the m aggregated links, wherein remaining ones of the m aggregated links are inactive links;
   transferring the data from the first network device to the second network device over the selected one of the m aggregated links; and
   selecting one of the inactive links as the active link when the link quality of the selected one of the m aggregated links is less than the link quality of the selected one of the inactive links;
   aggregating ones of the n ports to form the m aggregated links;
   before aggregating the ones of the n ports to form the m aggregated links, selecting the n ports to form a team; and
   assigning a media access control address to the team;
   wherein the first network device sends the data to the team by using the media access control address.

2. The method of claim 1, wherein the link quality for an aggregated link represents at least one of the group comprising:
   a link status of the data communication links in the aggregated link;
   a bandwidth of the aggregated link; and
   a bit error rate of the aggregated link.

3. The method of claim 1, wherein aggregating comprises:
   executing a link aggregation control protocol.

4. The method of claim 3, wherein the link aggregation control protocol complies with Institute of Electrical and Electronics Engineers (IEEE) standard 802.3ad.

5. The method of claim 1, wherein the media access control address is also assigned to one of the ports in the team.

6. The method of claim 1, further comprising:
   assigning an internet protocol address to the team;
   wherein the first network device sends the data to the team by using the internet protocol address.

7. Computer-readable media embodying instructions executable by a computer to perform a method for transferring data from a first network device comprising n ports to a second network device over a plurality of aggregated links, wherein each of the plurality of aggregated links comprises a plurality of data communication links, and wherein each of the n ports is connected to a different one of n data communication links, wherein n≧2, the method comprising:
   determining a link quality for each of m of the plurality of aggregated links, wherein m≧2, wherein each of the m aggregated links comprises a preselected plurality p of the n ports and the p data communication links connected to the p ports in the aggregated link;
   selecting one of the m aggregated links as an active link based on the link quality determined for each of the m aggregated links and a status of a switch that connects the first network device to the second network device via one of the m aggregated links, wherein remaining ones of the m aggregated links are inactive links;
   transferring the data from the first network device to the second network device over the selected one of the m aggregated links;
   selecting one of the inactive links as the active link when the link quality of the selected one of the m aggregated links is less than the link quality of the selected one of the inactive links;
   aggregating ones of the n ports to form the m aggregated links;
   before aggregating the ones of the n ports to form the m aggregated links, selecting the n ports to form a team; and
   assigning a media access control address to the team;
   wherein the first network device sends the data to the team by using the media access control address.

8. The media of claim 7, wherein the link quality for an aggregated link represents at least one of the group comprising:
   a link status of the data communication links in the aggregated link;
   a bandwidth of the aggregated link; and
   a bit error rate of the aggregated link.

9. The media of claim 7, wherein aggregating comprises:
   executing a link aggregation control protocol.

10. The media of claim 9, wherein the link aggregation control protocol complies with Institute of Electrical and Electronics Engineers (IEEE) standard 802.3ad.

11. The media of claim 7, wherein the media access control address is also assigned to one of the ports in the team.

12. The media of claim 7, wherein the method further comprises:
   assigning an internet protocol address to the team;
   wherein the first network device sends the data to the team by using the internet protocol address.

13. A network device for communicating data over a plurality of aggregated links, wherein each of the plurality of aggregated links comprises a plurality of data communication links, the network device comprising:
   n ports; and
   a processor that:
   determines a link quality for each of m of the plurality of aggregated links, wherein m≧2, wherein each of the m aggregated links comprises a preselected plurality p of the n ports;
   selects one of the m aggregated links as an active link based on the link quality determined for each of the m aggregated links and a status of a switch associated with at least one of the m aggregated links, wherein remaining ones of the m aggregated links are inactive links;

sends the data over the selected one of the m aggregated links;

selects one of the inactive links as the active link when the link quality of the selected one of the m aggregated links is less than the link quality of the selected one of the inactive links;

wherein the processor:

aggregates ones of the n ports to form the m aggregated links;

before aggregating the ones of the n ports to form the m aggregated links, selects the n ports to form a team;

assigns a media access control address to the team; and sends the data to the team by using the media access control address.

14. The network device of claim 13, wherein each of the n ports is connected to a different one of n of the data communication links, wherein n≧2, and wherein the link quality for an aggregated link represents at least one of the group comprising:

a link status of the data communication links in the aggregated link;

a bandwidth of the aggregated link; and a bit error rate of the aggregated link.

15. The network device of claim 13, wherein the processor aggregates ones of the n ports to form the m aggregated links by executing a link aggregation control protocol.

16. The network device of claim 15, wherein the link aggregation control protocol complies with Institute of Electrical and Electronics Engineers (IEEE) standard 802.3ad.

17. The network device of claim 13, wherein the media access control address is also assigned to one of the ports in the team.

18. The network device of claim 13, wherein the processor further:

assigns an internet protocol address to the team; and sends the data to the team by using the internet protocol address.

19. A network device for communicating data over a plurality of aggregated links, wherein each of the plurality of aggregated links comprises a plurality of data communication links, the network device comprising:

n port means for transferring data over the plurality of aggregated links; and processor means for:

determining a link quality for each of m of the plurality of aggregated links, wherein m≧2, wherein each of the m aggregated links comprises a preselected plurality p of the n port means;

selecting one of the m aggregated links as an active link based on the link quality determined for each of the m aggregated links and a status of a switch associated with at least one of the m aggregated links, wherein remaining ones of the m aggregated links are inactive links;

sending the data over the selected one of the m aggregated links, and selecting one of the inactive links as the active link when the link quality of the selected one of the m aggregated links is less than the link quality of the selected one of the inactive links, wherein the processor:

aggregates ones of the n ports to form the m aggregated links;

before aggregating the ones of the n ports to form the m aggregated links, selects the n ports to form a team;

assigns a media access control address to the team; and sends the data to the team by using the media access control address.

20. The network device of claim 19, wherein each of the n port means is connected to a different one of n of the data communication links, wherein n≧2, and wherein the link quality for an aggregated link represents at least one of the group comprising:

a link status of the data communication links in the aggregated link;

a bandwidth of the aggregated link; and a bit error rate of the aggregated link.

21. The network device of claim 19, wherein the processor aggregates ones of the n ports to form the m aggregated links by executing a link aggregation control protocol.

22. The network device of claim 21, wherein the link aggregation control protocol complies with Institute of Electrical and Electronics Engineers (IEEE) standard 802.3ad.

23. The network device of claim 19, wherein the media access control address is also assigned to one of the ports in the team.

24. The network device of claim 19, wherein the processor further:

assigns an internet protocol address to the team; and sends the data to the team by using the internet protocol address.

* * * * *